United States Patent
Chang

(10) Patent No.: US 6,712,240 B1
(45) Date of Patent: Mar. 30, 2004

(54) STRUCTURE OF A PIERCING DRAIN DEVICE USED ON A SEALED CHAMBER

(76) Inventor: Hsueh Chin Chang, P.O. Box 63-150, Taichung City (406) (TW)

( * ) Notice: Subject to any disclaimer, the term of this patent is extended or adjusted under 35 U.S.C. 154(b) by 0 days.

(21) Appl. No.: 10/318,048

(22) Filed: Dec. 13, 2002

(51) Int. Cl.[7] .............................................. F16L 41/04
(52) U.S. Cl. ..................... 222/83.5; 222/83; 222/88; 222/5; 141/330; 137/318
(58) Field of Search ................................ 141/329, 330; 222/81, 83, 83.5, 87, 88, 5; 137/318

(56) References Cited

U.S. PATENT DOCUMENTS

| | | | | |
|---|---|---|---|---|
| 1,069,388 A | * | 8/1913 | Colwell | 222/83 |
| 2,516,061 A | * | 7/1950 | Lieb | 222/83 |
| 3,698,419 A | * | 10/1972 | Tura | 137/318 |
| 4,112,944 A | * | 9/1978 | Williams | 604/244 |
| 4,852,769 A | * | 8/1989 | Robertson et al. | 222/83.5 |
| 5,291,914 A | * | 3/1994 | Bares et al. | 137/15.13 |
| 5,373,866 A | * | 12/1994 | Whalen, II | 137/318 |
| 5,398,718 A | * | 3/1995 | Roinick, Sr. | 137/318 |
| 6,053,362 A | * | 4/2000 | Lin | 222/80 |
| 6,381,821 B1 | * | 5/2002 | Panyon, Jr. | 29/33 R |

* cited by examiner

Primary Examiner—J. Casimer Jacyna

(57) ABSTRACT

The invention provides an improved structure of a piercing drain device used on a sealed chamber mainly comprising a first component, a second component, a piercing component, a first arc pad and a second arc pad. Because the first component and the second component are pivoted on their end portion, increasing the force arm, the force of clamping is then increased to improve the gastight. Without any pad or only with the first arc pad or with both the first and the second arc pad, the improved structure is used on three different sizes sealed chamber, and has wide range utilization.

1 Claim, 6 Drawing Sheets

STRUCTURE OF A PIERCING DRAIN DEVICE USED ON A SEALED CHAMBER

FIELD OF THE INVENTION

The invention is related to a structure of a piercing drain device used on a sealed chamber, in more particular, to an improved structure of a piercing drain device used on a sealed chamber, suitable for wider range utilization.

DESCRIPTION OF THE PRIOR ART

Referring to FIG. 1, a conventional structure of a piercing drain device used on a sealed chamber mainly comprises a first component 11, a second component 12 and a piercing component 13, wherein the first component 11 and the second component 12 are pivoted on a middle portion 131, like a scissors. The piercing component 13 is installed on the first component 11. A piercing portion 131 is configured on the piercing component 13. The fluid contained in the sealed chamber is used for cleaning the air-conditioner or other components in a vehicle. Therefore, utilizing the first component 11 and the second component 12 to clamp the sealed chamber, the piercing portion 131 of the piercing component 13 pierces into the sealed chamber by force. Then, pouring gas into the sealed chamber, the fluid in the sealed chamber will flow through the piercing portion 131, and the port 132, then along the pipeline to the location where the components are washed. It seems that the conventional structure is very ideal and practical. However, there are some drawbacks in the conventional structure. In the conventional structure of a piercing drain device used on a sealed chamber, the first component 11 and the second component 12 are pivoted on the middle portion 14, the force arm is not long enough, and therefore, the clamping force is not strong enough. Even if exerting all strength, the clamping is still not perfect enough. If the clamping is not perfect enough, the fluid in the chamber will leak out. The first component 11 is provided with a grip portion 15 limiting the activity of the fingers, and the exerting action will be influenced as well. Therefore, the operation will be much inconvenient. The sealed chamber sold in the market is divided into three sizes, large, medium and small. On the necessity of utilization, a user should prepare three ones in different sizes of the structure of a piercing drain device used on a sealed chamber. The piercing component 13 is made of copper. Therefore, one unit of the structure is high-priced. However, a user should prepare three units once. It is not economy for a user. The main objective of the present invention is to improve the drawbacks of the conventional structure.

SUMMARY OF THE INVENTION

The main object of the present invention is to provide an improved structure of a piercing drain device used on a sealed chamber (the structure hereinafter), wherein the structure has a wide range for utilization, and can be used on sealed chambers in three different sizes.

Another object of the present invention is to provide an improved structure of a piercing drain device used on a sealed chamber, wherein the first component and the second component are pivoted on their end portion, increasing the force arm, the force of clamping is then increased to improve the gastight.

Another object of the present invention is to provide an improved structure of a piercing drain device used on a sealed chamber, wherein the grip portion of the first component is formed as an open status; therefore, the fingers are not limited so that it contributes to the convenience of the operation.

The present invention provides an improved structure of a piercing drain device used on a sealed chamber, comprising:

a first component provided with a arc portion, a handle portion and a wedge portion located on the end near the handle portion;

a second component provided with a arc portion, a handle portion and a pin used to pivot the closing ends of the arc portions of both the first component and the second component; while the handle portion of the first component and the handle portion of the second component lean against each other, the wedge portion of the first component and the handle portion of the second component hook each other;

a piercing component utilizing a piercing portion to locate on the arc portion of the first component, and the piercing component is also provided with two connecting portion with different bore diameters;

a first arc pad pivoted on one side of the arc portion of the second component, the arc portion thereof leans against the arc portion of the second component at the right moment;

a second arc pad pivoted on one side of the arc portion of the second component, the arc portion thereof leans against the arc portion of the first arc pad at the right moment.

Achieving the objects of the invention, the method, technology and other effects are detailed described as follows by reciting a preferred embodiment of the invention accompanying with figures. The objects, features and other advantages can be understood by those descriptions.

DETAILED DESCRIPTION OF THE INVENTION

Figure 1:
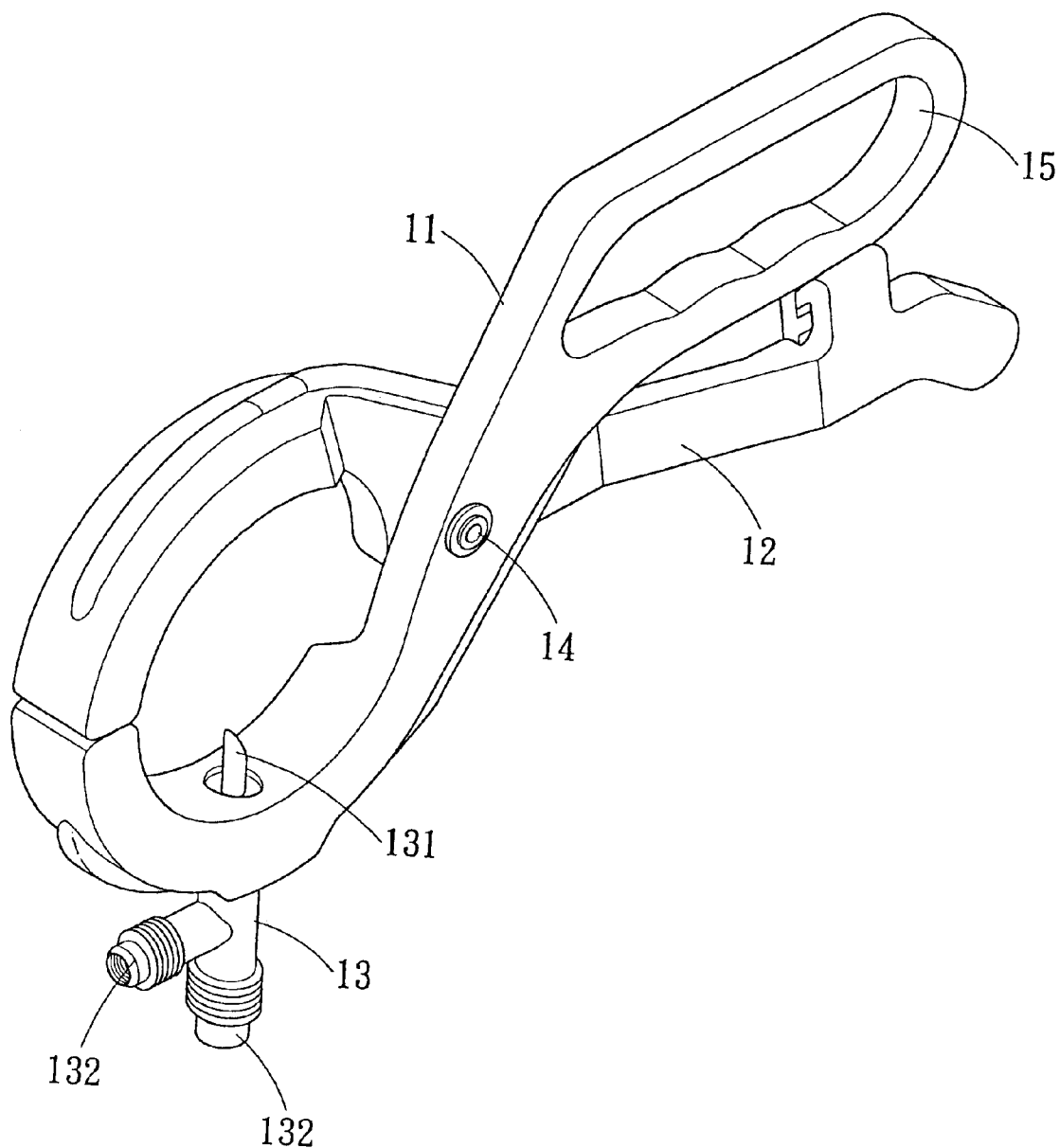
FIG. 1 is a perspective diagram of the conventional structure of a piercing drain device used on a sealed chamber.

Referring to FIG. 2 to FIG. 6, the present invention provides an improved structure of a piercing drain device used on a sealed chamber substantially comprising a first component 2, a second component 3, a piercing component 4, a first arc pad 5 and a second arc pad 6, wherein:

the first component 2 is provided with a arc portion 21, a handle portion 22 and a wedge portion 23 located on the end near the handle portion 22;

the second component 3 is provided with a arc portion 31, a handle portion 32 and a pin 33 used to pivot the closing ends of the respective arc portions 31, 21 of both the first component 2 and the second component 3; while the handle portion 22 of the first component 2 and the handle portion 32 of the second component 3 lean against each other, the wedge portion 23 of the first component 2 and handle portion 32 of the second component 3 hook each other, and they will not be apart from each other unless in the un-hooked status;

the piercing component 4 utilizing a piercing portion 41 to locate on the arc portion 21 of the first component 2, and the piercing component 4 is also provided with two connecting portion 42,43 with different bore diameters connecting to fixed location through a pipeline(not illustrated in the fig.);

the first arc pad 5 pivoted on one side of the arc portion 31 of the second component 3 (illustrated as in FIG. 2,3, on the right hand side), the arc portion 51 thereof leans against the arc portion 31 of the second component 3 at the right moment second arc pad 6 pivoted on one side of the arc portion 31 of the second component 3 (illustrated as in FIGS. 2,3,4, on the left hand side), the arc portion 61 thereof leans against the arc portion 51 of the first arc pad 5 at the right moment.

Figure 2:
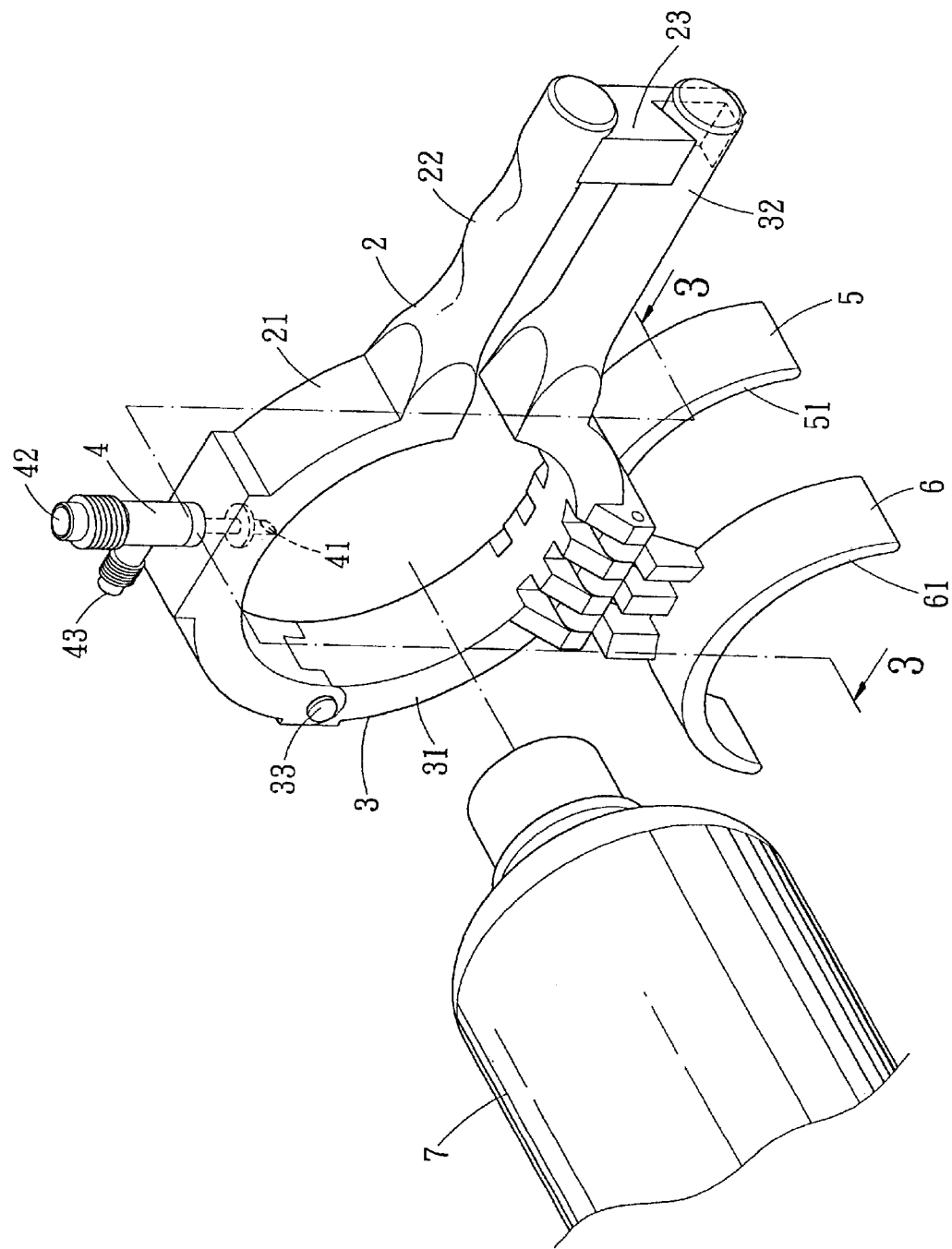
FIG. 2 is a perspective view of the invention used on a large sealed chamber.
Figure 3:
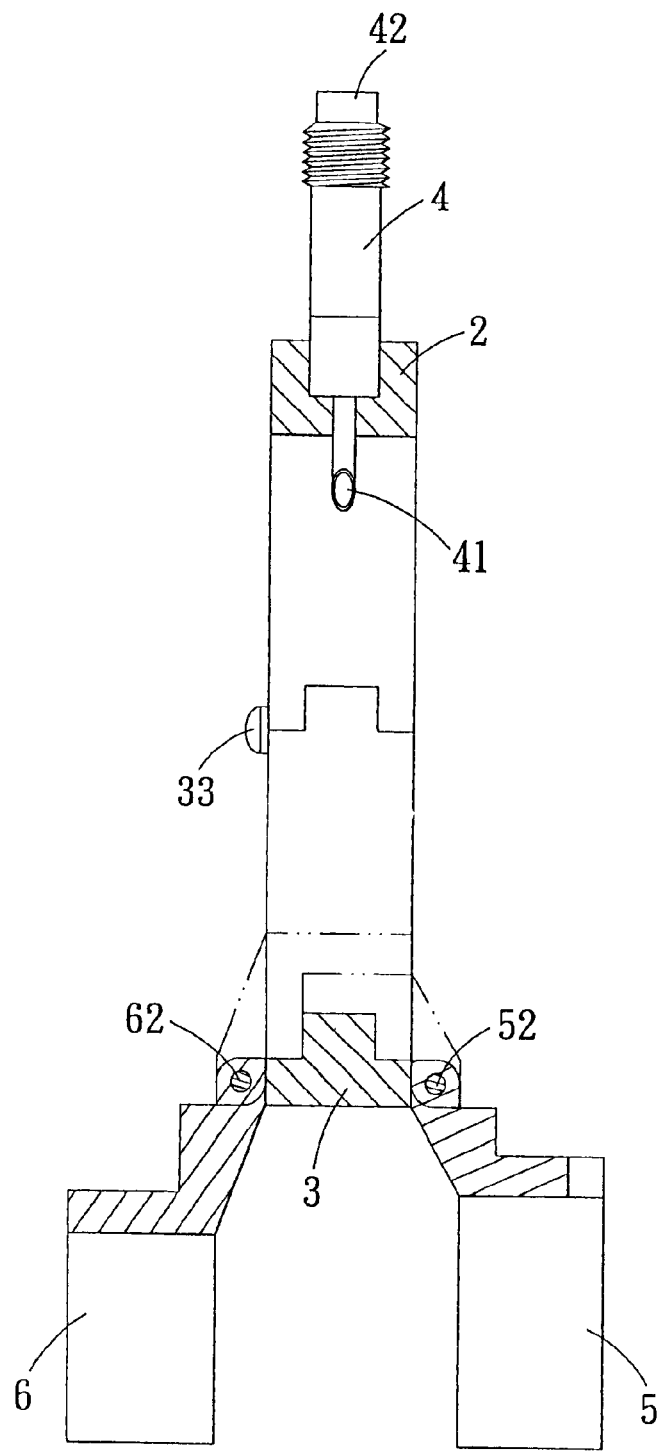
FIG. 3 is a cross sectional view of the pulled-down status of the first arc pad and the second arc pad.

Referring to FIG. 2 and FIG. 3, while the structure used on the largest diameter sealed chamber 7, users only pull down the first arc pad 5 and the second arc pad 6 pivoted respectively on axis 52,62. Therefore, the circle composed of the arc portion 21 of the first component 2 and the arc portion 31 of the second component 3 has the largest diameter so that the largest diameter sealed chamber 7 is received.

Users put the sealed chamber 7 in the circle composed of the arc portion 21 of the first component 2 and the arc portion 31 of the second component 3, and then force the piercing portion 41 of the piercing component 4 to pierce into the sealed chamber 7 to drain the fluid.

Figure 4:
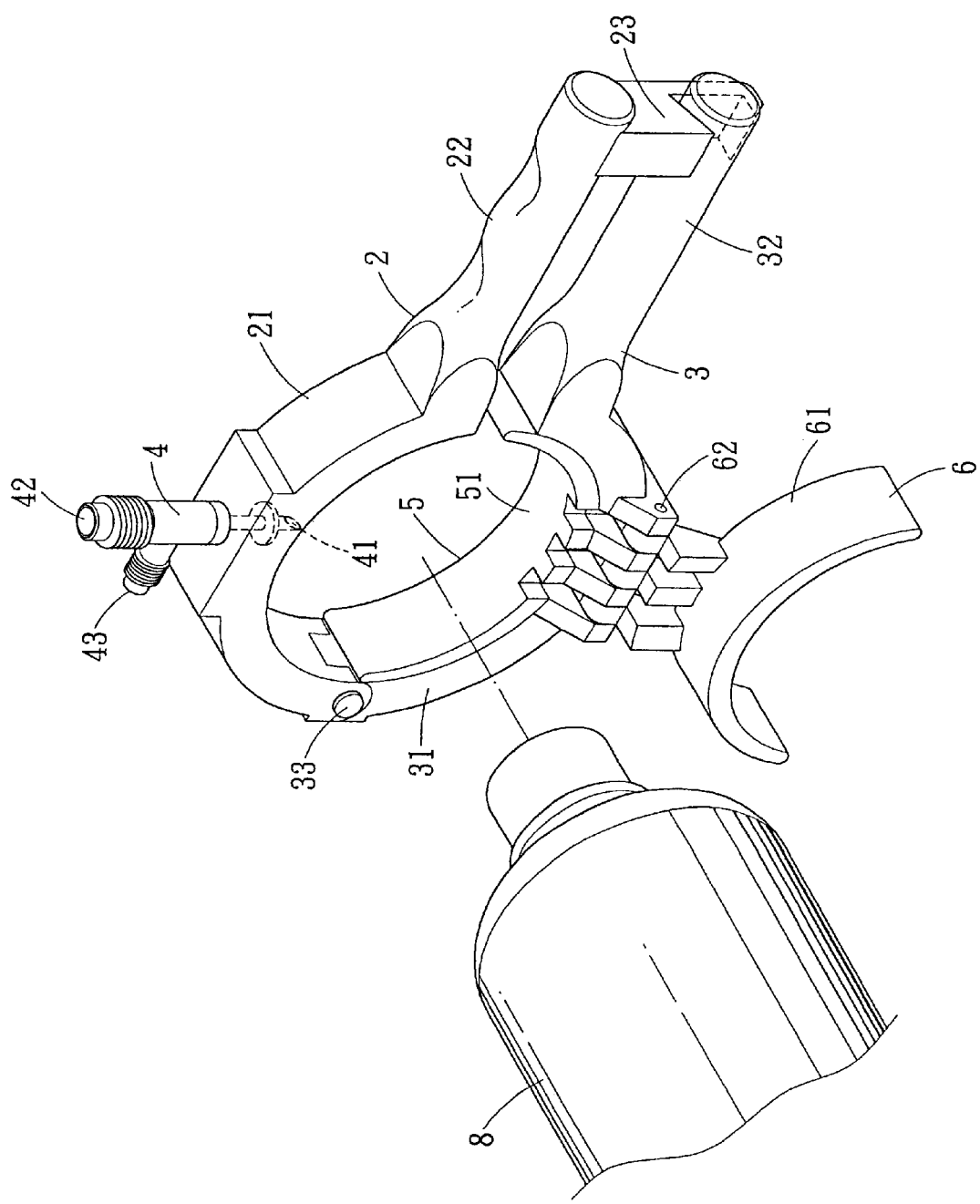
FIG. 4 is a perspective view of the invention used on a medium sealed chamber.

Referring to FIG. 4, while the structure used on the medium diameter sealed chamber 8, users only pull down the second arc pad 6 pivoted on axis 62. Therefore, the circle composed of the arc portion 21 of the first component 2 and the arc portion 51 of the first arc pad 5 has the medium diameter so that the medium diameter sealed chamber 8 is received. Users put the sealed chamber 8 in the circle composed of the arc portion 21 of the first component 2 and the arc portion 51 of the first arc component 5, and then force the piercing portion 41 of the piercing component 4 to pierce into the sealed chamber 8 to drain the fluid.

Figure 5:
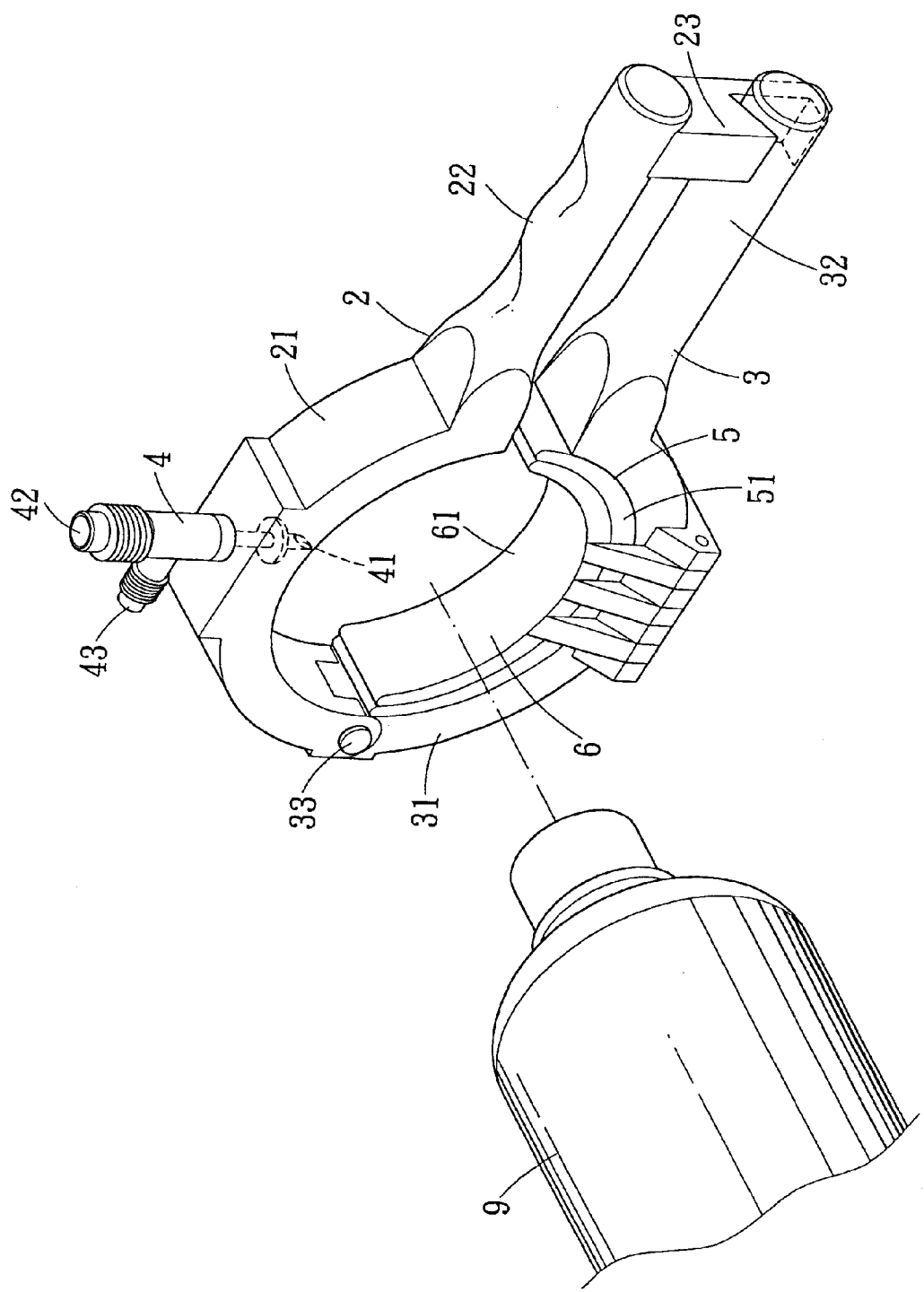
FIG. 5 is a perspective view of the invention used on a small sealed chamber.
Figure 6:
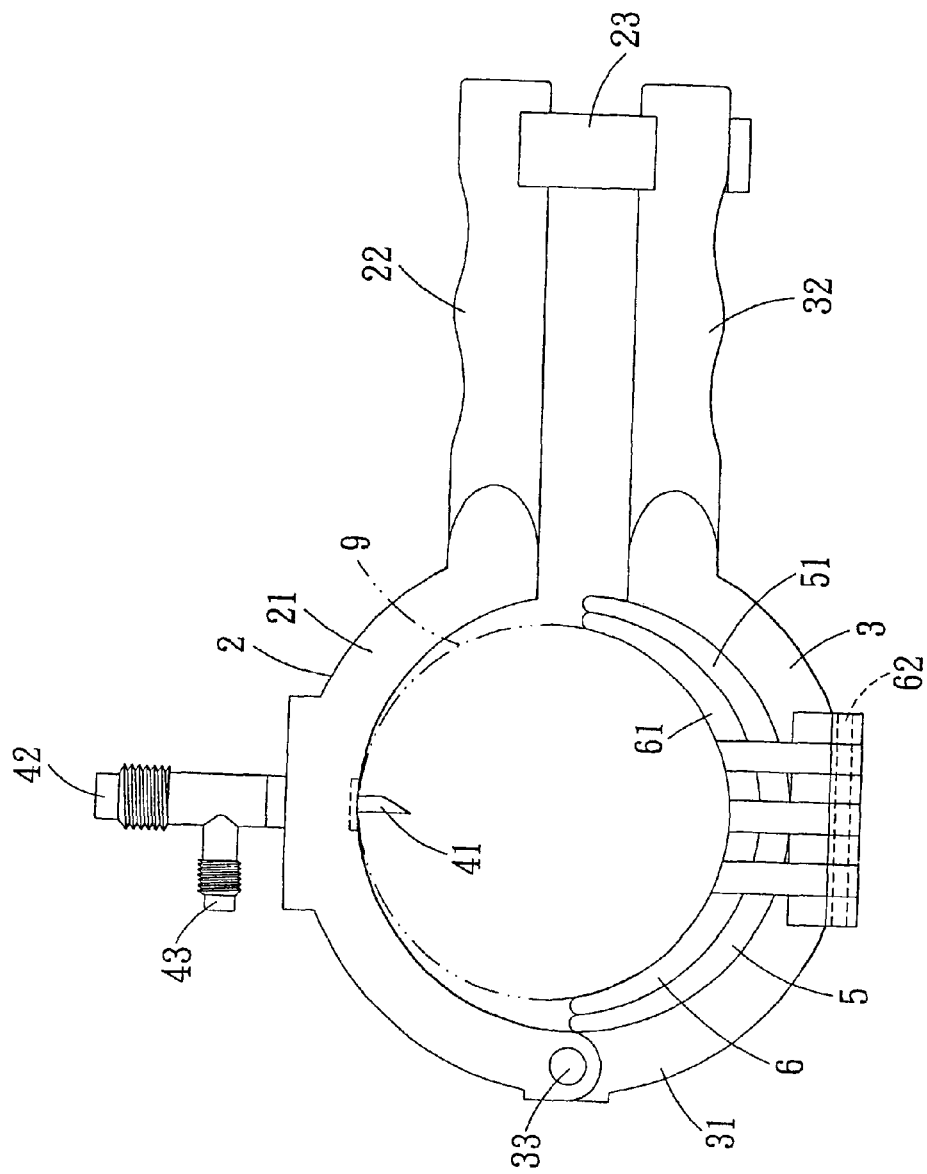
FIG. 6 is a front view of the invention used on a small sealed chamber.

Referring to FIGS. 5,6, while the structure used on the small diameter sealed chamber 9, users need to do nothing. Therefore, the circle composed of the arc portion 21 of the first component 2 and the arc portion 61 of the second arc pad 6 has the smallest diameter so that the medium diameter sealed chamber 9 is received. Users put the sealed chamber 9 in the circle composed of the arc portion 21 of the first component 2 and the arc portion 61 of the second arc component 6, and then force the piercing portion 41 of the piercing component 4 to pierce into the sealed chamber 9 to drain the fluid.

The structure disclosed in the invention has wide range utilization, and can be used on three different sizes sealed chamber by slight adjustment. Furthermore, in the invention, the grip portion of the first component is formed as an open status; therefore, the fingers are not limited so that it contributes to the convenience of the operation. Especially, in the invention, the first component and the second component are pivoted on their end portion, increasing the force arm; the force of clamping is then increased to improve the gastight. The present invention indeed can be utilized by industry, and the structure disclosed in the invention has not appeared in any publication and is not utilized publicly before submitting the application; moreover the structure also improves the effect. Therefore, the novelty and the non-obviousness of the invention are very clear, and the application is submitted according to the actions. We ask for the judgment and wish to obtain the patent as soon as possible.

What is claimed is:

1. An improved structure of a piercing drain device used on a sealed chamber, comprising:

a first component provided with a arc portion, a handle portion and a wedge portion located on the end near the handle portion;

a second component provided with a arc portion, a handle portion and a pin used to pivot the closing ends of the arc portions of both the first component and the second component; while the handle portion of the first component and the handle portion of the second component lean against each other, the wedge portion of the first component and the handle portion of the second component hook each other;

a piercing component utilizing a piercing portion to locate on the arc portion of the first component, and the piercing component is also provided with two connecting portion with different bore diameters;

a first arc pad pivoted on one side of the arc portion of the second component, the arc portion thereof leans against the arc portion of the second component at the right moment;

a second arc pad pivoted on one side of the arc portion of the second component, the arc portion thereof leans against the arc portion of the first arc pad at the right moment.

* * * * *